US012421987B2

(12) United States Patent
Oono et al.

(10) Patent No.: US 12,421,987 B2

(45) Date of Patent: Sep. 23, 2025

(54) HYDRAULIC ACTUATOR

(71) Applicant: BRIDGESTONE CORPORATION, Tokyo (JP)

(72) Inventors: Shingo Oono, Tokyo (JP); Shungo Fujita, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 18/719,525

(22) PCT Filed: Oct. 11, 2022

(86) PCT No.: PCT/JP2022/037843
§ 371 (c)(1),
(2) Date: Jun. 13, 2024

(87) PCT Pub. No.: WO2023/112446
PCT Pub. Date: Jun. 22, 2023

(65) Prior Publication Data

US 2025/0043806 A1 Feb. 6, 2025

(30) Foreign Application Priority Data

Dec. 17, 2021 (JP) ................................ 2021-205530

(51) Int. Cl.
*F15B 15/10* (2006.01)

(52) U.S. Cl.
CPC .................................. *F15B 15/103* (2013.01)

(58) Field of Classification Search
CPC .................................................. F15B 15/103
See application file for complete search history.

(56) References Cited

U.S. PATENT DOCUMENTS 5,083,498 A 1/1992 Sato et al.
2003/0110938 A1 6/2003 Seto et al.
(Continued)

FOREIGN PATENT DOCUMENTS

JP 61-262205 A 11/1986
JP 3-113104 A 5/1991
(Continued)

OTHER PUBLICATIONS

Development and Characterization of an Origami-Based Vacuum-Driven Bending Actuator for Soft Gripping (Year: 2023).*
(Continued)

*Primary Examiner* — Nathaniel E Wiehe
*Assistant Examiner* — Daniel S Collins
(74) *Attorney, Agent, or Firm* — Sughrue Mion, PLLC

(57) ABSTRACT

A hydraulic actuator includes a tube capable of being expanded and contracted by fluid pressure, a sleeve covering the tube, a pair of sealing members that seal both ends of the tube in an axial direction thereof, and plural inner pieces aligned inside the tube so as to be adjacent to each other. The plural inner pieces include a restraint side where adjacent inner pieces are in contact with each other in the tube whose inside is not pressurized by the fluid pressure and a swing side where a gap is made at an opposed position to the restraint side to allow the adjacent inner pieces to swing with respect to each other. The plural inner pieces further include a restraint mechanism that keeps the adjacent inner pieces in contact with each other on the restraint side in the tube whose inside is pressurized by the fluid pressure.

3 Claims, 6 Drawing Sheets

(56) References Cited

U.S. PATENT DOCUMENTS

| | | | |
|---|---|---|---|
| 2005/0081711 A1 | 4/2005 | Kerekes et al. | |
| 2019/0084497 A1 | 3/2019 | Roth et al. | |
| 2021/0071690 A1* | 3/2021 | Alexander | F15B 15/10 |

FOREIGN PATENT DOCUMENTS

| | | |
|---|---|---|
| JP | 2003-343513 A | 12/2003 |
| JP | 2014-224570 A | 12/2014 |
| JP | 2019-120373 A | 7/2019 |
| JP | 2021-088999 A | 6/2021 |
| WO | 2017/198436 A1 | 11/2017 |

OTHER PUBLICATIONS

International Search Report for PCT/JP2022/037843 dated Dec. 6, 2022.

* cited by examiner

Fig. 7(c)
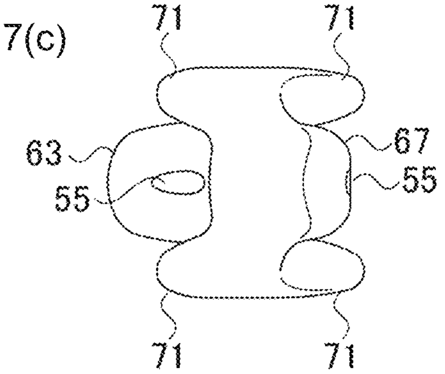
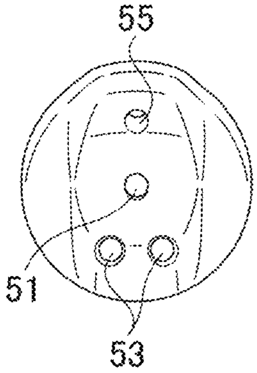
Fig. 7(e)
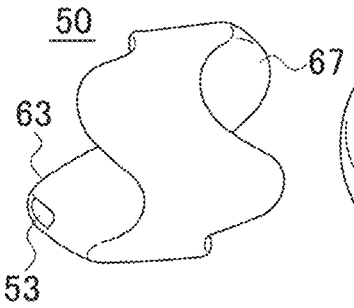
Fig. 7(a)
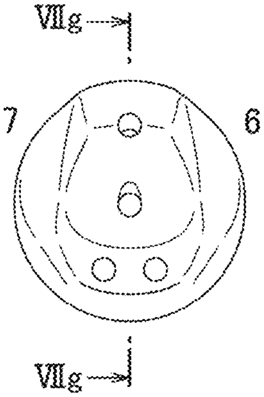
Fig. 7(f)
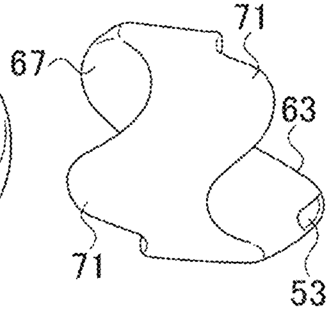
Fig. 7(b)
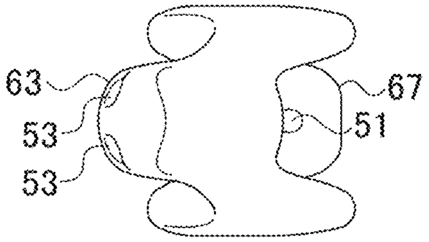
Fig. 7(d)
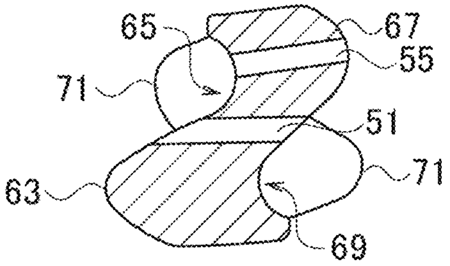
Fig. 7(g)

HYDRAULIC ACTUATOR

CROSS REFERENCE TO RELATED APPLICATIONS

This application is a National Stage of International Application No. PCT/JP2022/037843 filed Oct. 11, 2022, claiming priority based on Japanese Patent Application No. 2021-205530 filed Dec. 17, 2021.

TECHNICAL FIELD

The present invention relates to a hydraulic actuator, especially to a so-called McKibben-type hydraulic actuator.

BACKGROUND ART

Conventionally, as a hydraulic actuator that expands and contracts a tube using gas or liquid, widely used is a (so-called McKibben-type) structure with a rubber tube that expands and contracts by air pressure and a sleeve that covers the outer surface of the tube.

Also known is a McKibben-type hydraulic actuator in which its tube and its sleeve are curled during contraction from an axially-extending state (see Patent Literature 1). Specifically, a hydraulic actuator is known that has a leaf spring provided inside the sleeve of the hydraulic actuator from one end to the other end in the axial direction, and can be curled by the action of the leaf spring. In such a McKibben-type hydraulic actuator to be curled, excessive curling of the hydraulic actuator, which may occur when the fluid pressure increases, is suppressed by limiting the curling of the tube by weave angle of the sleeve.

CITATION LIST

Patent Literature

[Patent Literature 1]
Japanese Patent Laid-Open Publication No. 2021-88999

SUMMARY OF INVENTION

However, a conventional curling-type hydraulic actuator may be subject to gradual plastic deformation when its leaf spring for curling the hydraulic actuator is curled repeatedly, and thus it is concerned that its restoring force will reduce.

An object of the present invention is to provide a hydraulic actuator, capable of curling, that can prevent excessive curling potentially caused by increasing of a fluid pressure in the hydraulic actuator, and whose restoring force to a pre-curling state hardly reduces even when it curls repeatedly, i.e., that has high repeat durability.

A hydraulic actuator according to embodiments of the present invention includes a tube capable of being expanded and contracted by fluid pressure, a sleeve that is a structural member made of woven fiber cords directed in predetermined directions to exert stretchability and covers an outer circumferential surface of the tube, a pair of sealing members that seal both ends of the tube in an axial direction thereof, respectively, and plural inner pieces that are aligned inside the tube so as to be adjacent to each other. The plural inner pieces are configured to include a restraint side where adjacent inner pieces are in contact with each other in the tube whose inside is not pressurized by the fluid pressure and a swing side where a gap is made at an opposed position to the restraint side to allow the adjacent inner pieces to swing with respect to each other. The plural inner pieces further include a restraint mechanism that keeps the adjacent inner pieces in contact with each other on the restraint side in the tube whose inside is pressurized by the fluid pressure.

According to the above configuration, it is possible to provide a hydraulic actuator, capable of curling, that can prevent excessive curling potentially caused by increasing of a fluid pressure in the hydraulic actuator, and whose restoring force to a pre-curling state hardly reduces even when it curls repeatedly, i.e., that has high repeat durability.

BRIEF DESCRIPTION OF DRAWINGS

FIG. 6(*a*) is a perspective view mainly showing a left side of the inner piece in FIG. 4, and FIG. 6(*b*) is a perspective view mainly showing a right side of the inner piece in FIG. 4.

FIGS. 7(*a*)-7(*g*) show a six-view drawing and a cross-sectional view, taken along a vertically-extending centerline in a side view, of the inner piece that is not directly fixed to the sealing members among the plural inner pieces; FIG. 7(*a*) is a front view, FIG. 7(*b*) is a rear view, FIG. 7(*c*) is a plan view, FIG. 7(*d*) is a bottom view, FIG. 7(*e*) is a left side view, FIG. 7(*f*) is a right side view, and FIG. 7(*g*) is the cross-sectional view taken along a line VIIg-VIIg in FIG. 7(*f*).

DESCRIPTION OF EMBODIMENTS

Hereinafter, one embodiment will be described based on the drawings. Note that the same functions and structures are denoted by the same or similar reference signs, and their description will be omitted accordingly.

(1) Overall Schematic Configuration of Hydraulic Actuator

Figure 1:
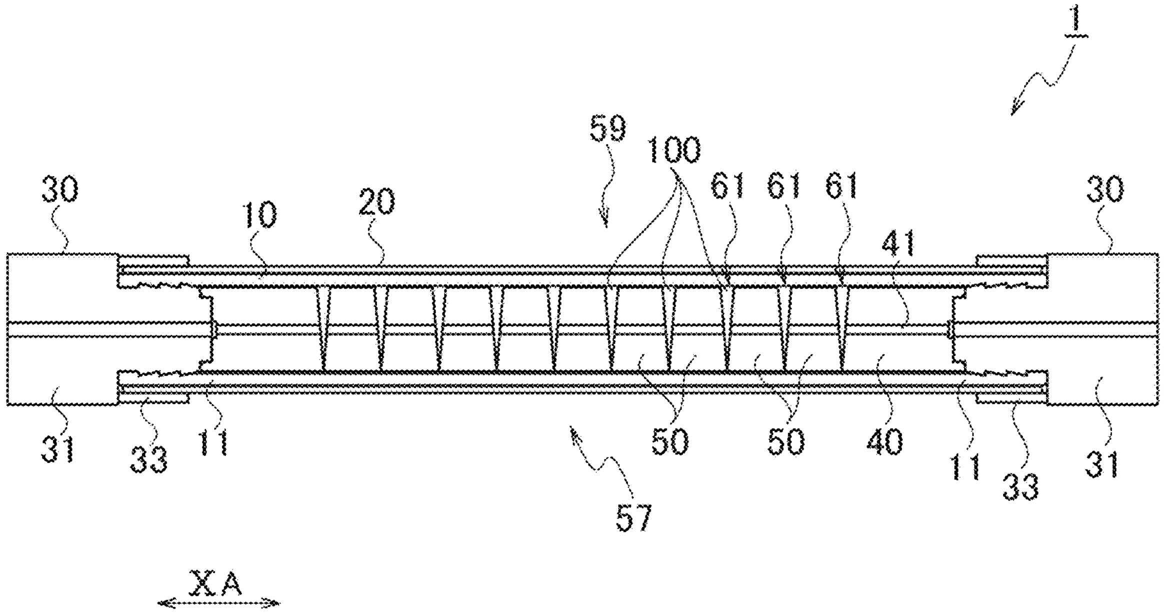
FIG. 1 is a cross-sectional view along an axial direction schematically showing a state before a hydraulic actuator according to one embodiment contracts/curls.
Figure 2:
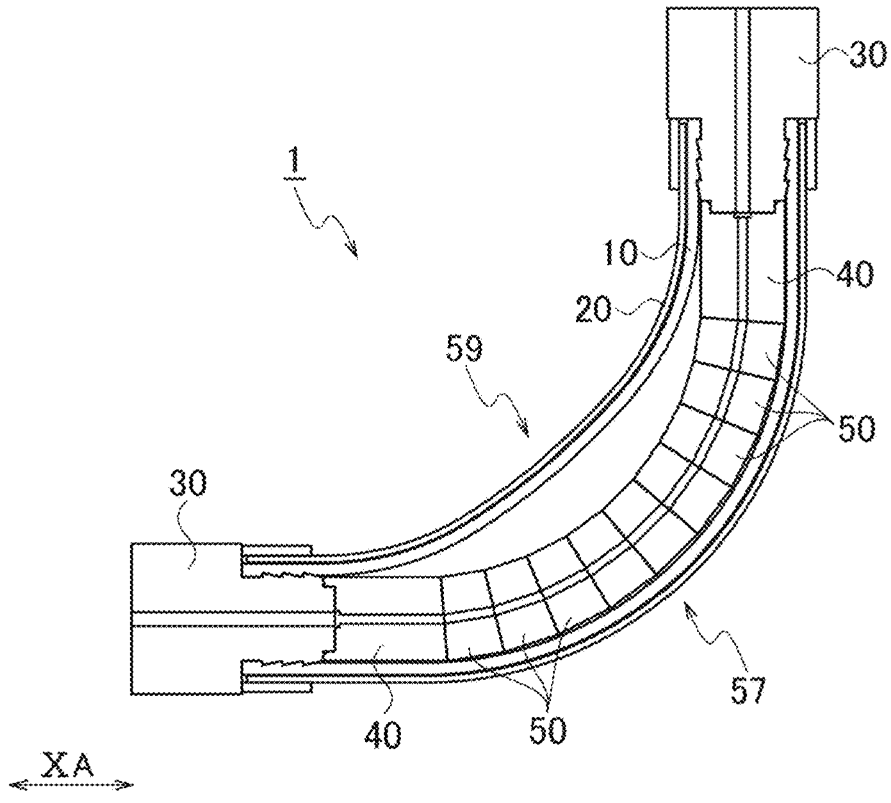
FIG. 2 is a cross-sectional view schematically showing a state where the hydraulic actuator contracts/curls.

FIG. 1 is a cross-sectional view along an axial direction XA schematically showing a state before a hydraulic actuator 1 according to the one embodiment contracts/curls. FIG. 2 is a cross-sectional view schematically showing a state where the hydraulic actuator 1 contracts/curls.

As shown in FIG. 1, the hydraulic actuator 1 includes a tube 10 capable of being expanded and contracted by fluid pressure, a sleeve 20 that is a structural member made of woven fiber cords directed in predetermined directions (predetermined weave angle) to exert stretchability and covers an outer circumferential surface of the tube 10, and a pair of sealing members 30 that seal both ends 11 of the tube 10 in an axial direction XA thereof, respectively.

As a basic characteristic, when the fluid pressure in the tube 10 is increased, the hydraulic actuator 1 of the embodiment expands in its radial direction while being restricted by the tension of the fiber cords forming the sleeve 20 and contracts in the axial direction XA of the hydraulic actuator 1. When the fluid pressure in the tube 10 is decreased, its length in the axial direction XA is restored. This shape change allows the hydraulic actuator 1 to function as an actuator.

The hydraulic actuator 1 like this is a so-called McKibben-type hydraulic actuator. This hydraulic actuator 1 can be suitably used not only for artificial muscles, but also for body limbs (upper limbs, lower limbs and so on) of robots that require higher capacity (contraction force). The pair of the sealing members 30 may be provided with a joint portion (not shown in the drawings) or the like to be connected with a member or the like to be jointed.

In the present embodiment, while using a McKibben-type hydraulic actuator having such basic characteristics, plural inner pieces 40, 50 arranged adjacent to each other in the axial direction XA inside the tube 10 are provided as members for curling the hydraulic actuator by restraining its compression in the axial direction XA. The phrase "restraining" the compression of the hydraulic actuator in the axial direction XA can be rephrased as regulating or restricting the compression of the hydraulic actuator in the axial direction XA.

As shown in FIG. 1, the inner pieces 40 located at both ends of the plural inner pieces 40, 50 in the axial direction XA are fixed to sealing members 30 provide as a pair, respectively. Then, the plural inner pieces 40, 50 are arranged between the paired sealing members 30. In addition, as shown in FIG. 1, the plural inner pieces 40, 50 are configured to include a restraint side 57 where the adjacent inner pieces 40, 50 are in contact with each other in the tube 10 whose inside is not pressurized by fluid pressure, and a swing side 59 where a gap 61 is made at an opposed position to the restraint side 57 to allow the adjacent inner pieces 40, 50 to swing with respect to each other.

With respect to the plural inner pieces 40, 50, the adjacent inner pieces 40, 50 are in contact with each other on the restraint side 57 even within the tube 10 in the state not pressurized by the fluid pressure. Therefore, the plural inner pieces 40, 50 resist the compression by the tube 10 applied between the sealing members 30. As a result, the contraction of the tube 10 along the axial direction XA is inhibited on the restraint side 57. At the same time, the tube 10 can contract in the axial direction XA on the swing side 59 until the adjacent inner pieces 40, 50 contact each other and the gaps 61 are decreased. Therefore, the length of the tube 10 on the swing side 59 is relatively shorter than the length of the tube 10 on the restraint side 57. This state is shown in FIG. 2, where the hydraulic actuator 1 of the present embodiment can be deformed from the state in which it extends along the axial direction XA before the pressurization shown in FIG. 1 to the curled state in which it curls to the swing side 59. Note that the state in which the gaps 61 are decreased includes not only a state in which the gaps 61 are fully closed but also a state in which the gaps 61 are narrowed.

Fluid used to actuate the hydraulic actuator 1 may be either a gas, such as air, or a liquid, such as water or mineral oil. The hydraulic actuator 1 can have high durability to withstand hydraulic actuation with high pressure on the tube 10 and sleeve 20.

The pair of sealing members 30 seals the both ends 11 of the tube 10 in the axial direction XA. Specifically, each of the sealing members 30 includes a sealing member main body 31 and a crimp member 33. The sealing member main body 31 seals the end 11 of the tube 10 in the axial direction XA. The crimp member 33 crimps the tube 10 and the sleeve 20 together with the sealing member main body 31. It is acceptable that press marks, which are marks made when the crimp member 33 is crimped by a jig, are formed on the outer circumferential surface of the crimp member 33.

The sealing member main body 31 of at least one sealing member 30 of the pair of the sealing members 30 is provided with a connection port to which a hose (conduit) connected to an actuation pressure source of the hydraulic actuator 1 is attached. The fluid pressure inside the tube 10 is controlled by the fluid that flows into and out of the hydraulic actuator 1 via a fluid passage that is connected to this connection port, and the tube 10 of the hydraulic actuator 1 expands and contracts. Not that the driving pressure source of the hydraulic actuator 1 is, for example, a gas or liquid compressor.

(2) Configuration of Hydraulic Actuator 1

As shown in FIG. 1, the hydraulic actuator 1 is configured of the tube 10, the sleeve 20, the pair of the sealing members 30, and the plural inner pieces 40, 50, as described above.

The tube 10 is a hollow cylindrical tube that is expanded or contracted by the fluid pressure. The tube 10 is made from an elastic material such as butyl rubber because of repeated expansion and contraction by the fluid. When the hydraulic actuator 1 is actuated hydraulically, it is preferable that the elastic material is NBR (nitrile rubber) with high oil resistance, or is at least one material selected from a group consisting of hydrogenated NBR, chloroprene rubber, and epichlorohydrin rubber.

The sleeve 20 has a hollow cylindrical shape and covers the outer circumferential surface of the tube 10 in the hydraulic actuator 1. The sleeve 20 is a structural member made of woven fiber cords directed in predetermined directions relative to the axial direction XA of the tube 10 (axial direction of the hydraulic actuator 1) whose inside pressure is not yet increased to exert stretchability. The fiber cords are woven to have a structure in which the directed fiber cords form a repetitive-rhombic pattern by being crossed each other. By having such a pattern, the sleeve 20 deforms in a pantograph manner and follows the expansion and contraction of the tube 10 while regulating the expansion and contraction.

Note that, in the McKibben-type hydraulic actuator 1, the sleeve 20, which is crimped onto the sealing members 30 together with the tube 10, is actuated so that the weave angle of the woven fiber cords converges to 54.7 degrees when the hydraulic actuator 1 is actuated. Therefore, in a case where the weave angle before the hydraulic actuator 1 is actuated is smaller than 54.7 degrees, the hydraulic actuator 1 gets shrunk in the axial direction. And, in a case where the weave angle is greater than 54.7 degrees, the hydraulic actuator 1 gets elongated in the axial direction.

The sleeve 20 used in the present embodiment is woven so that the directions of the fiber cords of the sleeve 20 before the expansion and contraction form the predetermined weave angle greater than 54.7 degrees relative to the axial direction XA of the hydraulic actuator 1 before pressure is applied thereto. In other words, the directions of the fiber cords, which regulate the deformation of the tube 10 due to changes of its internal fluid pressure, are oriented so as to be the predetermined directions (predetermined weave angle) by which the hydraulic actuator 1 gets shortened when the tube 10 is expanded. Specifically, the fiber cords are woven into the sleeve 20 so that the weave angle becomes 15 degrees to 40 degrees.

The hydraulic actuator 1 using this sleeve 20 is actuated so as to be shortened, because the weave angle of the sleeve 20 becomes larger than the pre-shortening weave angle (gets closer to 54.7 degrees) at the increase of the fluid pressure in the tube 10.

Aromatic polyamide (aramid fiber) or polyethylene terephthalate (PET) fiber cords are preferred as the fiber cords that configures the sleeve 20. However, they are not limited to these types of fiber cords, but may also be made of high-strength fiber cords such as PBO fiber (poly-paraphenylene benzobisoxazole), for example.

In addition, in the present embodiment, the plural inner pieces 40, 50 are aligned in the axial direction XA inside the tube 10 so as to be adjacent to each other as shown in FIG. 1. The inner pieces 40 disposed at both ends in the axial direction XA, among the plural inner pieces 40, 50, are fixed to the paired sealing members 30, respectively. The plural inner pieces 40, 50 are configured such that, in the tube 10 before the pressurization, the adjacent inner pieces 40, 50 are in contact with each other on one side perpendicular to the axial direction XA (on the restraint side 57) and the gaps 61 are made on an opposite side to the one side (on the swing side 59) so as to allow the adjacent inner pieces 40, 50 to swing with respect to each other.

The plural inner pieces 40, 50 are aligned inside the tube 10 in a state before the pressurization of the hydraulic actuator 1, with the number of the inner pieces 40, 50 corresponding to the length of the hydraulic actuator 1 in the axial direction XA. Specifically, the plural inner pieces 40, 50 are aligned so that the adjacent inner pieces are surely in contact with each other on the restraint side 57 from the one of the sealing members 30 to the other of the sealing member 30. If the length of the tube 10 in the axial direction XA is short, the plural inner pieces may be formed with only the two inner pieces 40. In other words, among the plural inner pieces, the inner piece 50, which is adjacent to only one of the paired inner pieces 40 fixed to the paired sealing members 30, or not adjacent to any of the paired inner pieces 40, may be omitted. In addition, if the length of the tube 10 in the axial direction XA is long, the number of the inner pieces 50 located between the inner pieces 40 may be increased or the length of the inner pieces 50 may be changed to get the inner pieces contacted with each other on the restraint side 57.

The material of the plural inner pieces 40, 50 may be selected from materials that provide compressive stiffness enough not to be deformed when the hydraulic actuator 1 is actuated so as to be shortened in the axial direction XA by the increase of the fluid pressure in the tube 10, especially not to be deformed by compressive stress applied thereto on the restraint side 57. The material of the plural inner pieces 40, 50 may be resin such as thermoplastic synthetic resin, a hard plastic, or a hard foam material such as hard foam synthetic resin. The material of the plural inner pieces 40, 50 may be metal such as stainless steel. If it is desired to make the hydraulic actuator 1 lighter, it is preferable to make it of resin, a hard plastic, or a hard foam material.

Specific shapes of the plural inner pieces 40, 50 in the present embodiment will be described with reference to FIGS. 3 to 7(*g*).

Figure 3:
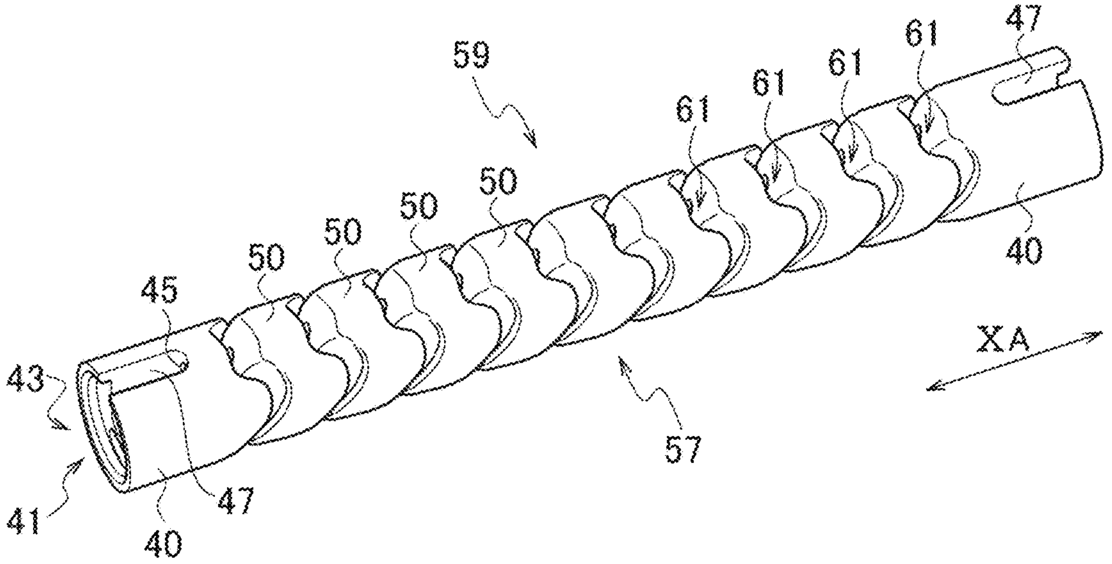
FIG. 3 is a perspective view showing a state where plural inner pieces get contact with each other that are aligned in the hydraulic actuator.
Figure 4:
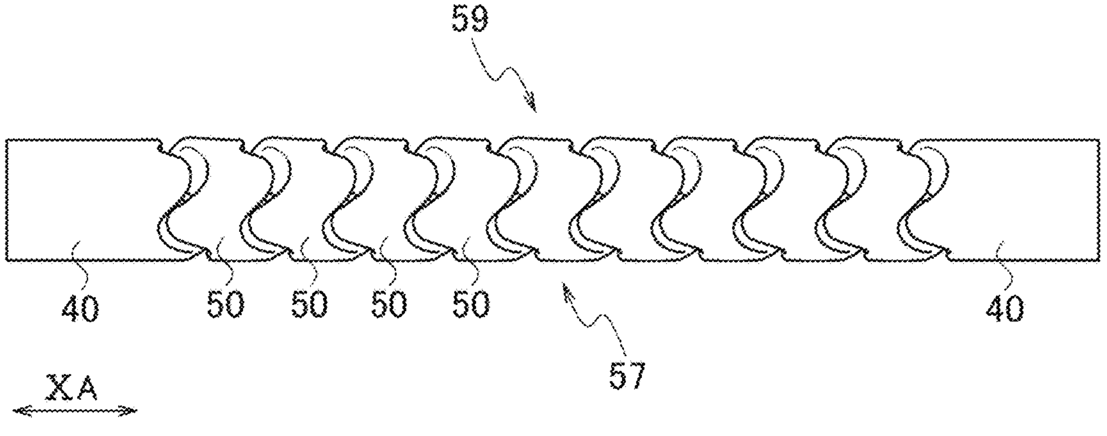
FIG. 4 is a side view showing a state of the plural inner pieces before the hydraulic actuator curls.
Figure 5:
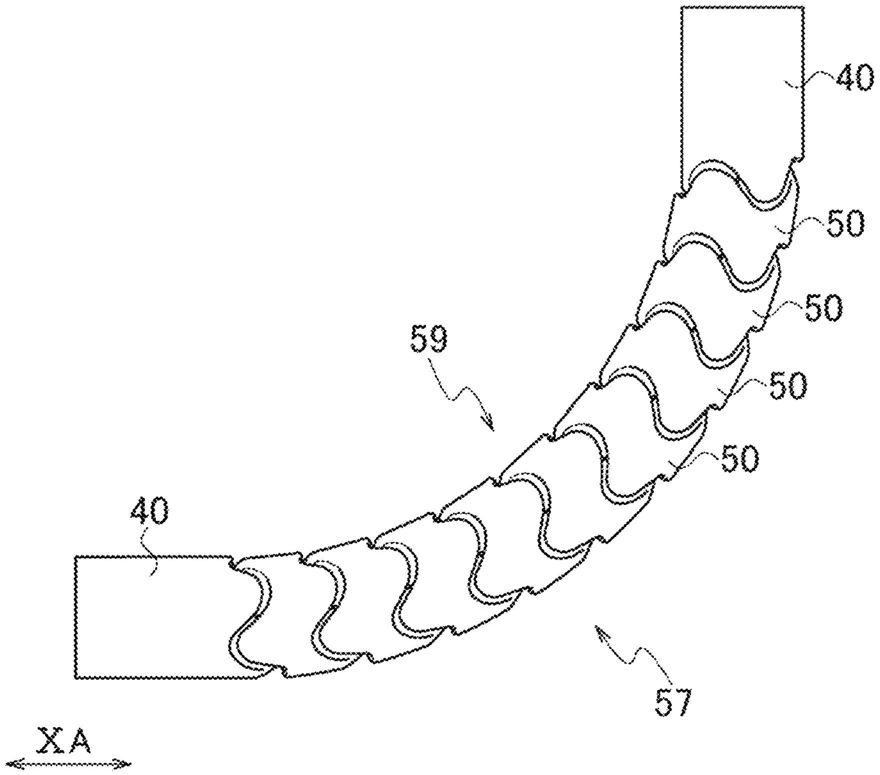
FIG. 5 is a side view showing a state of the plural inner pieces after the hydraulic actuator curls.
Figure 6A:
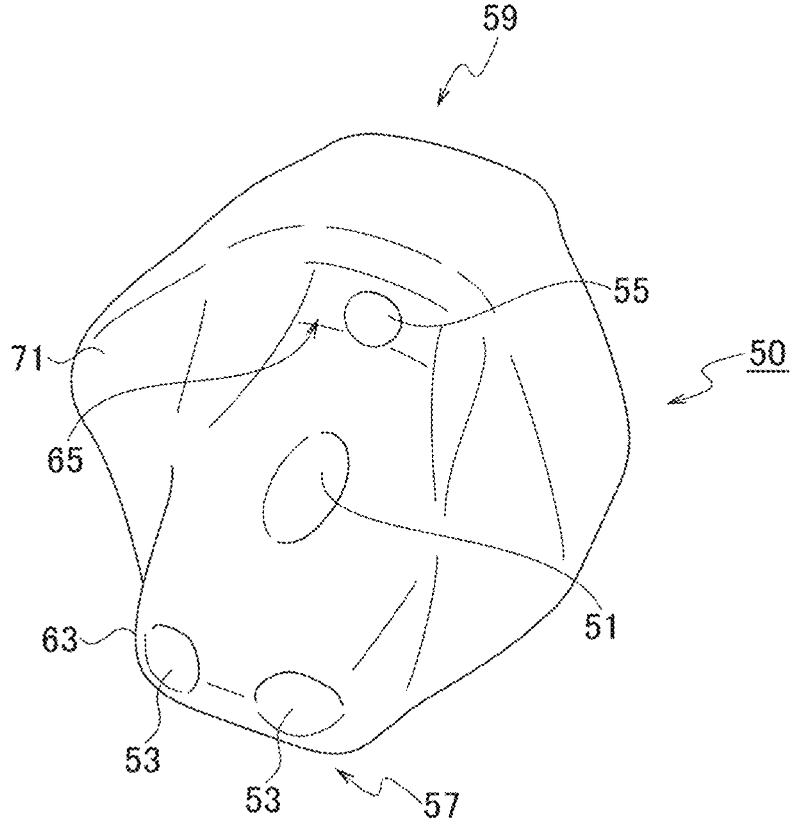
FIGS. 6(*a*)-6(*b*) show perspective views of an inner piece that is not directly fixed to a sealing member among the plural inner pieces.
Figure 6B:
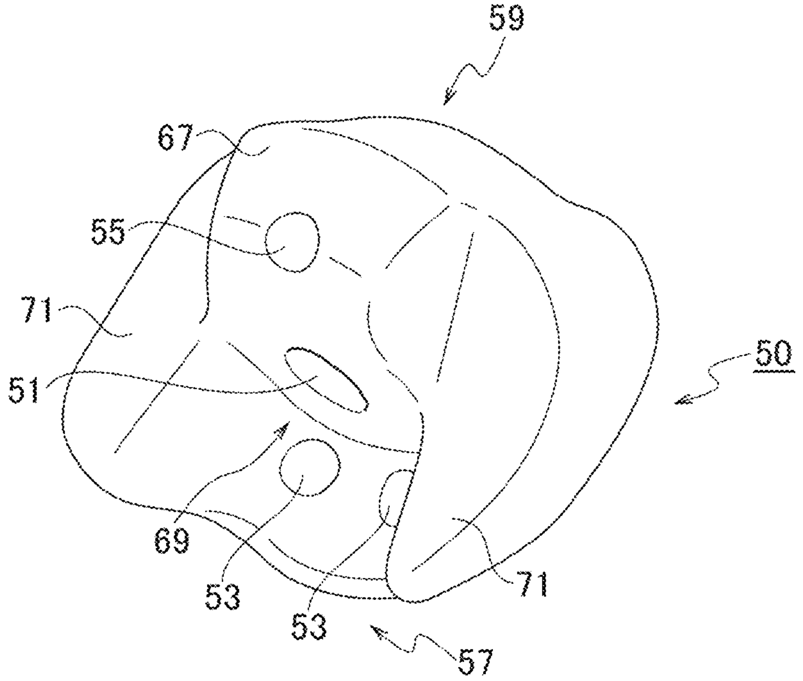

FIG. 3 is a perspective view showing a state in which the plural inner pieces 40, 50 arranged inside the hydraulic actuator 1 are in contact with each other so as to be capable of being aligned in the hydraulic actuator 1 before it curls. FIG. 4 is a side view of the plural inner pieces 40, 50 in the state shown in FIG. 3. FIG. 5 is a side view showing a state in which the plural inner pieces 40, 50 are in the curled state and in contact with each other. FIGS. 6(*a*)-6(*b*) show perspective views of the inner piece 50 that is not directly fixed to the sealing member 30 among the plural inner pieces 40, 50. FIG. 6(*a*) is a perspective view mainly showing a left side of the inner piece in FIG. 4. FIG. 6(*b*) is a perspective view mainly showing of a right side of the inner piece in FIG. 4. FIGS. 7(*a*)-7(*f*) show a six-view drawing of the inner pieces 50 that is not directly fixed to the sealing member 30 among the plural inner pieces 40, 50. FIG. 7(*g*) is a cross-sectional view taken along a line VIIg-VIIg in FIG. 7(*f*). The six-view drawing in FIGS. 7(*a*)-7(*f*) includes a front view in FIG. 7(*a*), a rear view in FIG. 7(*b*), a plan view in FIG. 7(*c*), a bottom view in FIG. 7(*d*), a left side view in FIG. 7(*e*), and a right side view in FIG. 7(*f*).

FIGS. 3 and 4 show the state in which the plural inner pieces 40, 50 are aligned in the tube 10 of the hydraulic actuator 1 before the pressurization of the tube 10 (the state before the hydraulic actuator 1 curls, the state shown in the schematic view in FIG. 1). The inner pieces 40, 50 are aligned so that the adjacent inner pieces are in contact with each other on the restraint side 57 and the gaps 61 are formed on the swing side 59. Then, as shown in FIGS. 3 and 4, the plural inner pieces 40, 50 form an almost cylindrical shape with the axial direction XA as its axis so as to match the shape of the interior space of the tube 10 in a state where they are adjacent to each other.

FIG. 5 shows the state of the plural inner pieces 40, 50 aligned in the tube 10 of the hydraulic actuator 1 after the tube 10 is pressurized (the state after the hydraulic actuator 1 is curled, the state shown in the schematic view in FIG. 2). In this state, with respect to the plural inner pieces 40, 50, the plural inner pieces 40, 50 are curled until there is no gap 61 on the swing side 59, or the gaps 61 become narrower, while the contact state on the restraint side 57 is maintained.

Next, the specific structure of the inner piece 50 that is not directly fixed to the sealing member 30 (other than the pair of the inner pieces 40 located at both ends) will be described with reference to FIGS. 6(*a*)-6(*b*) and FIGS. 7(*a*)-7(*g*).

As shown in FIGS. 6(*a*) and 7(*g*), on the left side face of the inner piece 50 relative to the front view of FIG. 7(*a*), a first convex portion 63 is formed on the restraint side 57 (a lower side in FIG. 7(*a*)) and a first concave portion 65 is formed on the swing side 59 (an upper side in FIG. 7(*a*)). As shown in FIGS. 6(*b*) and 7(*g*), on the right side face of the inner piece 50, a second convex portion 67 is formed on the swing side 59 and a second concave portion 69 is formed on the restraint side 57.

When the plural inner pieces 50 are aligned adjacent to each other, on the restraint side 57, the first convex portion 63 of one inner piece 50 enters the second concave portion 69 of the other inner piece 50 and contacts the second concave portion 69. On the other hand, on the swing side 59, the second convex portion 67 of the other inner piece 50 enters the first concave portion 65 of the one inner piece 50, but does not contact the first concave portion 65 to form the gap 61. In other words, in the inner pieces 50, the protrusion of the first convex portion 63 in the axial direction XA is greater than the depression of the second concave portion 69, so that the adjacent inner pieces 50 contact each other on the restraint side 57. And, the gap 61 is formed between the adjacent inner pieces 50 on the swing side 59, because the protrusion of the second convex portion 67 in the axial direction XA is less than the depression of the first concave portion 65.

As shown in FIGS. 7(*b*), 7(*c*), 7(*g*) and so on, on the restraint side 57 or the swing side 59, side walls 71, which protrude in the axial direction XA from both side portions of a position where the first concave portion 65 or the second concave portion 69 is formed, respectively, are formed on both sides of the middle portion where the first convex portion 63, the first concave portion 65, the second convex portion 67 and second concave portion 69 are formed. As shown in FIG. 7(*g*), with respect to the protruding direction of the side walls 71, the side walls 71 formed besides the first concave portion 65 protrude similarly to the first convex portion 63, and the side walls 71 formed besides the second concave portion 69 protrude similarly to the second convex portion 67.

The side walls 71 restrain relative motions, such as rotations about the axial direction XA, of the adjacent inner pieces 40, 50 in the tube 10. The side walls 71 also prevent the hydraulic actuator 1 from curling in a direction other than the curling direction by contacting the adjacent first convex portion 63 or the adjacent second convex portion 67, even when stress perpendicular to the axial direction XA is applied to the hydraulic actuator 1. Note that, as shown in FIG. 7(*g*), the side walls 71 are formed to have a protrusion that does not interfere with the swinging of the inner piece 50 or the curling of the hydraulic actuator 1.

As shown in FIGS. 7(*e*) and 7(*f*), a vent hole 51 is formed in the inner piece 50 so as to penetrate the center of its circular outer circumference. In addition, two first through holes 53 are formed on the restraint side 57 and a second through hole 55 is formed on the swing side 59.

Each one end of the first through holes 53 is opened on the first convex portion 63 as shown in FIGS. 6(*a*), 7(*a*), 7(*b*) and 7(*d*) and each other end thereof is opened in the second concave portion 69 as shown in FIG. 6(*b*). And one end of the second through hole 55 is opened in the first concave portion 65 as shown in FIGS. 6(*a*) and 7(*g*), and the other end thereof is opened on the second convex portion 67 as shown in FIGS. 6(*b*), 7(*c*) and 7(*g*).

Figure 8:
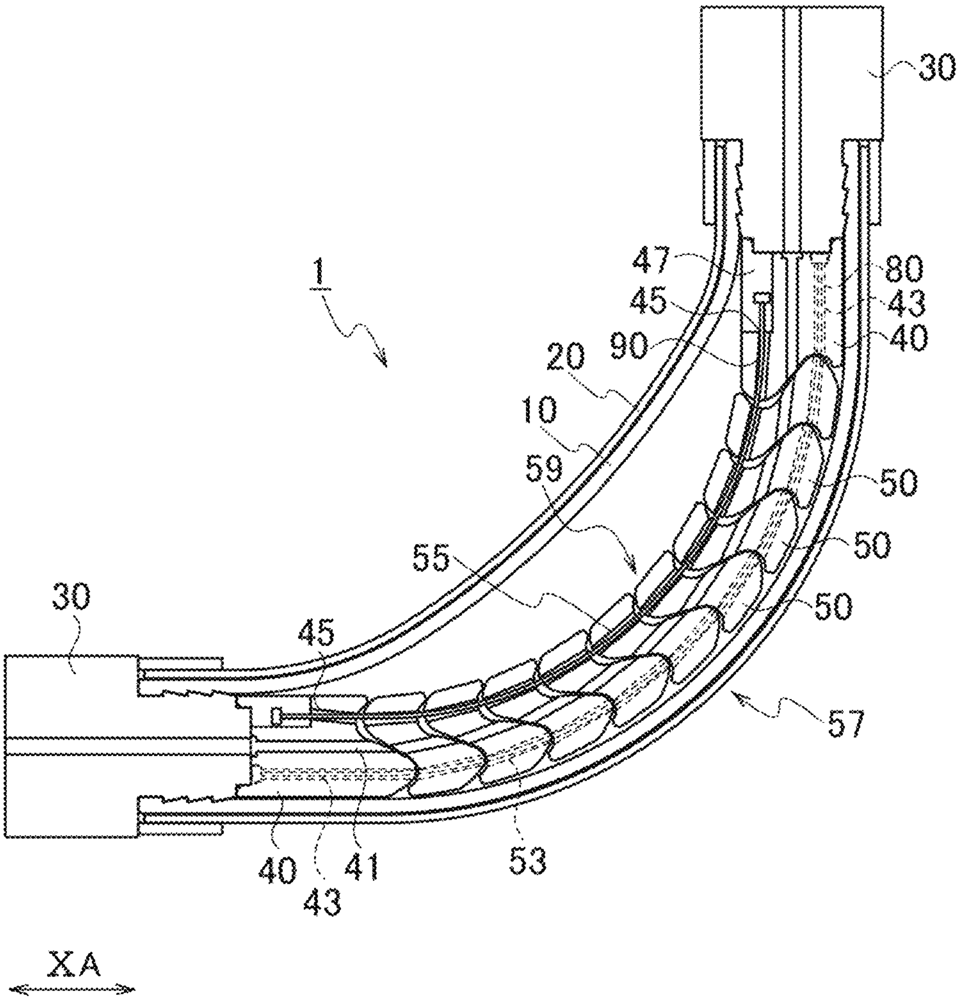
FIG. 8 shows a cross-sectional view of the hydraulic actuator according to the present embodiment in its contracted and curled state with a restraint fiber cord for keeping the inner pieces in contact with each other on a restraint side and an anti-reverse-curling cord located on a swing side.

FIG. 8 shows a cross-sectional view of the hydraulic actuator 1 according to the present embodiment in its contracted and curled state with restraint fiber cords 80 for keeping the inner pieces 40, 50 in contact with each other on the restraint side 57 and an anti-reverse-curling cord 90 located on the swing side 59.

As shown in FIGS. 1 and 8, a vent hole 41 through which the fluid can flow in and out of the sealing member 30 is formed in each of the inner pieces 40 that are configured to be placed at both ends of the axial direction XA and fixed to the paired sealing members 30, respectively. Similarly to the inner piece 50 shown in FIGS. 6(*a*)-6(*b*) and FIGS. 7(*a*)-7(*g*), two first through holes 43 are formed on the restraint side 57 and one second through hole 45 is formed on the swing side 59.

In the present embodiment, the end of the second through hole 45 closer to the sealing member 30 is opened in a notch (locator portion) 47 formed at a portion of the inner piece 40 that is on the swing side 59 and closer to the sealing member 30. The notch 47 also functions as an eye mark that clearly indicates the swing side 59 toward which the inner pieces 40, 50 are capable of curling.

In the present embodiment, as shown in FIG. 1, a rubber cushion member 100 is disposed in each gap 61 formed on the swing side between the adjacent inner pieces 40, 50. The cushion member 100 is a member that can be compressed so that the swinging of the inner pieces 40, 50 is not significantly restricted during the curling deformation of the hydraulic actuator 1, and that restores the inner pieces 40, 50 to their pre-pressurized posture as shown in FIG. 1 when the inside of the tube 10 of the hydraulic actuator 1 is depressurized.

The cushion member 100 is suitably made of rubber, urethane foam, or other material that exhibits the desired compressibility that does not significantly restrict the swinging of the inner pieces 40, 50 during the curling deformation of the hydraulic actuator 1 and good restorative properties that can restore the inner pieces 40, 50 to their pre-pressure state against repeated compression deformation.

A clearance may be provided, in consideration of the shape of the compressed and deformed cushion member 100, in the gap 61 where the cushion member 100 is placed so that the curling deformation of the inner pieces 40, 50 is not inhibited when the cushion member 100 is deformed.

The inner piece 40 can be secured to the sealing member 30 in any manner, as long as it is secured to the sealing member 30 in a state where the vent hole 41 is kept passed through without preventing the fluid from flowing through the sealing member 30.

For example, as shown in FIG. 8, a recess in the axial direction XA that can fit into the outer circumference of the sealing member 30 may be formed at the axial end of the inner piece 40. The fluid passage of the sealing member 30 may be formed with a larger diameter than that required as a flow path, and a protruding portion in the axial direction XA may be formed on the inner piece 40 to fit into the inner circumference of the fluid passage of the sealing member 30. Note that the vent hole 41 of the inner piece 40 is essential for allowing fluid to flow in and out of the sealing member 30. However, the vent hole 51 of the inner piece 50 do not have to be formed in the inner piece 50 because fluid can flow in and out of the tube 10 from the position where the inner piece 40 and the inner piece 50 are adjacent to each other.

The sealing member(s) 30 seals the end 11 of the tube 10 in the axial direction XA of the hydraulic actuator 1. The sealing member 30 is configured of a sealing member main body 31 and a crimp member 33.

The sealing member main body 31 is inserted into the tubular tube 10. Specifically, the sealing member main body 31 has a head whose diameter is larger than the inner diameter of the tube 10 and a stem having an outer diameter that can be inserted into the inner diameter of the tube 10. The stem is inserted into the tube 10.

A metal such as stainless steel may be suitably used as the sealing member main body 31, but it is not limited to such a metal. For example, a hard plastic material may be used as the sealing member main body 31.

The crimp member(s) 33 crimps the tube 10 into which the sealing member main body 31 is inserted and the sleeve 20 covering the outer circumferential surface of the tube 10 together with the sealing member main body 31. Specifically, the crimp member 33 is provided around the circumference of the portion where the sealing member main body 31 is inserted into the tube 10 and the sleeve 20, and crimps these members 10 and 20 onto the sealing member main body 31.

Metals such as aluminum alloys, brass, and iron can be used for the crimp member 33. When the crimp member 33 is crimped by a crimping jig, the press marks may be formed on the crimp member 33.

Note that the sealing member(s) 30 may be provided with an engagement ring (not shown) for engaging the sleeve 20 with the sealing member main body 31. Specifically, the sleeve 20 may be folded radially outwardly via the engagement ring.

A shape of the engagement ring may be a shape that can be engaged with the sealing member main body 31. In addition, a material such as metal or hard plastic similar to that of the sealing member main body 31, or a material such as natural fibers (natural fiber threads) or rubber (e.g., O-ring) can be used for a material of the engagement ring.

(3) Configuration of Restraint Mechanism 43, 53, 80

In the hydraulic actuator 1 according to the present embodiment, the plural inner pieces 40, 50 further include a restraint mechanism 43, 53, 80 that keeps the adjacent plural inner pieces 40, 50 in contact with each other on the restraint side 57 in the tube 10 whose inside is pressurized by the fluid pressure.

The first through holes 43 of the inner piece 40 and the first through holes 53 of the inner piece 50, or the opposing first through holes 53 are formed to be communicated with each other in a state where they are adjacent to each other. The second through hole 45 of the inner piece 40 and the second through hole 55 of the inner piece 50, or the opposing second through holes 55 are similarly formed to be communicated with each other in a state where they are adjacent to each other.

The restraint mechanism 43, 53, 80 includes the first through holes 43, 53 formed in each of the inner pieces 40, 50 so as to be communicated with each other on the restraint side 57 between the adjacent inner pieces 40, 50 or the adjacent inner pieces 50, and the restraint fiber cords 80 that is inserted through the first through holes 43, 53 from one end to the other end of the plural inner pieces 40, 50 in the axial direction XA to keep the inner pieces 40, 50 in contact with each other on the restraint side 57.

The plural first through holes 43, 53 of the restraint mechanism may be formed in each of the inner pieces 40, 50. In the present embodiment, the two first through holes 43, 53 are formed in each of the inner pieces 40, 50, as shown in FIGS. 6(*a*), 6(*b*) and so on.

Each of the plural first through holes 43, 53 is communicated with each other from the one end to the other end of the plural inner pieces 40, 50 in the axial direction XA, and the restraint fiber cords 80 are inserted through each path of the first through holes 43, 53.

In the present embodiment, the two restraint fiber cords 80 are inserted from the one end to the other end of the plural inner pieces 40, 50 in the axial direction XA. Each end of the restraint fiber cords 80 has a structure such that it does not enter into the interior of the first through hole 43 while the restraint fiber cords 80 extend through the first through holes 43, 53. In other words, each end of the restraint fiber cords 80 has a larger diameter than an inner diameter of the first through hole 43. The restraint fiber cords 80 restrain the relative motion of the adjacent inner pieces 40, 50 while being extended through the first through holes 43, 53. Furthermore, due to the restriction by the two restraint fiber cords 80, the relative motion, such as rotation between the adjacent inner pieces 40, 50 in the tube 10, can be restrained.

Note that the material of the restraint fiber cords 80 may be selected from among fiber cords that can be used for fiber cords of the sleeve 20 in consideration of the desired tensile strength or the like.

On the swing side 59 where the plural inner pieces 40, 50 are adjacent to and in contact with each other from the one end to the other of the plural inner pieces 40, 50 in the axial direction XA, the second through holes 45, 55 are communicated with each other from the one end to the other of the plural inner pieces 40, 50 in the axial direction XA. An anti-reverse-curling cord 90 for restricting the gaps 61 on the swing side 59 from widening from their state before the pressurization by the fluid pressure is extended through the second through holes 45, 55.

The anti-reverse-curling cord 90 has a length equivalent to the distance between the openings of the second through holes 45 in the notches 47 formed on the swing side 59 of the inner pieces 40 placed at both ends in the non-curling state shown in FIGS. 3, 4 and so on, and its each end has a structure such that it does not enter into the interior of the second through hole 45, as shown in FIG. 8. In other words, each end of the anti-reverse-curling cord 90 has a larger diameter than an inner diameter of the second through hole 45.

Note that, when the hydraulic actuator 1 is curled as shown in FIG. 8, each end of the anti-reverse-curling cord 90 is distanced from the opening of the second through hole 45 in the notch 47, that is, no tensile tension is generated in the anti-reverse-curling cord 90. If the hydraulic actuator 1 curls in a direction from its expanded state such that the gaps 61 on the swing side 59 are widened from its state before the pressurization by the fluid pressure, each end of the anti-reverse-curling cord 90 contacts the opening of the second through hole 45 in the notch 47 to generate tensile tension in the anti-reverse-curling cord 90, and thereby the reverse-curling of the hydraulic actuator 1 is prevented.

Note that the material of the anti-reverse-curling cord 90 may be selected from among fiber cords that can be used for fiber cords of the sleeve 20 in consideration of the desired tensile strength or the like.

(4) Configuration of Sealing Mechanism

As shown in FIGS. 1, 2 and 8, the stem of the sealing member main body 31 of the sealing member 30 is inserted into the tube 10. The tube 10 and the sleeve 20 covering the outer circumferential surface of the tube 10 are crimped onto the sealing member main body 31 by the crimp member 33.

The crimp member 33 is larger than the outer diameter of the stem of the sealing member main body 31, and then crimped by a jig after the stem is inserted into it. The crimp member 33 crimps the tube 10 and the sleeve 20 together with the sealing member main body 31.

(5) Functions and Advantages

The hydraulic actuator 1 has the following features.

Large curling angle (capable of curling more than 180 degrees)

Generated Force is large (approx. 40N)

Easy to control force (generated force is proportional to pressure)

Simple structure

Also capable of direct contacting with the manipulation target according to surface coating In addition, the hydraulic actuator 1 according to the present embodiment can be curled to a predetermined curled shape based on the structure of the inner pieces 40, 50, which restrict the expansion and contraction of the tube 10. Therefore, the hydraulic actuator 1 does not excessively curl beyond the predetermined curved shape, even when the pressure in the tube 10 increases excessively.

In addition, even when the hydraulic actuator 1 is repeatedly curled, the inner pieces 40, 50 are not deformed, because the hydraulic actuator 1 is curled by providing the restraint side 57 and the swing side 59 on the inner pieces 40, 50 that are made of a material with compressive rigidity. Therefore, the hydraulic actuator 1 has high repeat durability because the restoring force to the state before curling is hardly decreased even after being curled repeatedly.

In addition, the relative motion between the adjacent inner pieces 40, 50 is restrained by the restraint mechanisms 43, 53, 80. Thus, for example, the curling structure of the hydraulic actuator 1 can be maintained, even when the pressure in the tube 10 is excessively increased and tensile stress is applied between the sealing members 30.

Furthermore, in the hydraulic actuator 1, the tube 10 is sealed by the sealing members 30 with the inner pieces 40, 50 disposed therein. Therefore, the volume in the tube 10 becomes smaller than the volume in the tube 10 when the inner pieces 40, 50 are not disposed therein. The smaller volume in the tube 10 allows the pressure in the tube to increase more easily in the hydraulic actuator 1 according to the present embodiment than in a case where the inner pieces 40, 50 are not used, and thereby the response speed of the hydraulic actuator 1 can be improved.

(6) Other Embodiments

Although the contents of the present invention have been described in accordance with the above embodiment, it is obvious to those skilled in the art that the present invention is not limited to the descriptions and that various modifications and improvements are possible.

In the present embodiment, the plural inner pieces 40, 50 aligned inside the hydraulic actuator 1 as shown in FIGS. 3 and 4 are in a state they are adjacent to and in contact with each other to form an almost cylindrical shape with the axial direction XA as its axis. Then, the restraint side 57 where the adjacent inner pieces 40, 50 are in contact with each other is always located on a first side circumferentially with respect to the tube 10. Furthermore, the swing side 59 is located on a second side opposite to the first side. However, locations of the restraint side 57 and the swing side 59 in the plural inner pieces 40, 50 arranged inside the hydraulic actuator 1 with respect to the tube 10 is not limited to the above locations.

Each of the restraint side 57 and the swing side 59 in the plural inner pieces 40, 50 needs not always be located on the same side with respect to the tube 10, and the locations of the restraint side 57 and the swing side 59 with respect to the tube 10 may be interchangeable.

Specifically, the restraint side 57 is located on the first side and the swing side 59 is located on the second side in a section from one end to a predetermined position in the axial direction XA of the tube 10 and the restraint side 57 is located on the second side and the swing side 59 is located on the first side in the other section from the above-mentioned predetermined position to the other end, so that the deformation of the tube 10 during curling may be S-shaped.

In this case, for example, adopted may be a configuration where the inner pieces 50 are arranged as follows: the first convex portion 63 and the first concave portion 65 is kept unchanged on the left side; the second convex portion 67 is formed at the location of the second concave portion 69 and the second concave portion 69 is formed at the location of the second convex portion 67 on the right side; the first through hole 53 penetrates through each inner piece so as to connect the first convex portion 63 with the second concave portion 69; and the second through hole 55 penetrates through each inner piece so as to connect the first concave portion 65 with the second convex portion 67.

In addition, the cushion member 100 is made of rubber, urethane foam or the like in the present embodiment, but the cushion member 100 is not limited to these. As the cushion member 100, a member that can ensure the curling of the hydraulic actuator 1 by being easily compressible and deformable when the inside of the tube 10 is pressurized, and that can restore the posture of the inner pieces 40, 50 to its pre-pressurized state when the inside of the tube 10 is depressurized, should be selected. For example, with respect to the cushion member 100, a spring with an elastic modulus satisfying the above conditions may be placed in the gap 61 as the cushion member 100. If the largest possible amount of curling is required, the cushion member 100 may be omitted from the configuration.

Although the embodiment of the present invention is described above, the descriptions and the drawings that form part of this disclosure should not be understood as limiting the invention. Various alternative embodiments, examples, and operational techniques will be apparent to those skilled in the art from this disclosure.

The invention claimed is:

1. A hydraulic actuator comprising:

a tube capable of being expanded and contracted by fluid pressure;

a sleeve that is a structural member made of woven fiber cords directed in predetermined directions to exert stretchability and covers an outer circumferential surface of the tube;

a pair of sealing members that seal both ends of the tube in an axial direction thereof, respectively, and a plurality of inner pieces that are aligned inside the tube so as to be adjacent to each other, wherein the plurality of inner pieces is configured to include a restraint side where adjacent inner pieces are in contact with each other in the tube whose inside is not pressurized by the fluid pressure and a swing side where a gap is made at an opposed position to the restraint side to allow the adjacent inner pieces to swing with respect to each other, wherein the plurality of inner pieces further includes a restraint mechanism that keeps the adjacent inner pieces in contact with each other on the restraint side in the tube whose inside is pressurized by the fluid pressure, wherein the restraint mechanism is provided with a first through hole that is formed in each inner piece to communicate with a first through hole formed in an adjacent inner piece on the restraint side, and a restraint fiber cord that is inserted through the first through hole from one end to another end of the plurality of inner pieces in the axial direction to keep the inner pieces in contact with each other on the restraint side, and wherein the first through hole of the restraint mechanism is formed to have a plurality of first through holes in each inner piece, and a plurality of the restraint fiber cords is inserted through the plurality of first through holes, respectively.

2. The hydraulic actuator according to claim 1, further comprising a second through hole that is formed in adjacent inner pieces from one end to another end of the plurality of inner pieces in the axial direction, and an anti-reverse-curling cord that is inserted through the second through hole from the one end to the other end of the plurality of inner pieces in the axial direction to restrict the gap on the swing side from widening from a state before pressurization by the fluid pressure.

3. The hydraulic actuator according to claim 1, wherein a cushion member is disposed in the gap formed on the swing side of adjacent inner pieces, and wherein the cushion member restores a posture of the plurality of inner pieces to a state thereof in which the inside of the tube is not pressurized.

* * * * *